United States Patent [19]

Martin

[11] Patent Number: 4,505,367

[45] Date of Patent: Mar. 19, 1985

[54] FLUID FRICTION CLUTCH

[75] Inventor: Hans Martin, Stuttgart, Fed. Rep. of Germany

[73] Assignee: Sueddeutsche Kuehlerfabrik Julius Fr. Behr GmbH & Co. KG, Fed. Rep. of Germany

[21] Appl. No.: 446,683

[22] Filed: Dec. 3, 1982

[30] Foreign Application Priority Data

Dec. 11, 1981 [DE] Fed. Rep. of Germany ....... 3149104

[51] Int. Cl.³ .................. F16D 33/12; F16D 43/25; F16D 35/00
[52] U.S. Cl. ................. 192/58 B; 192/30 V; 192/82 T
[58] Field of Search ............... 192/58 B, 82 T, 30 V; 277/1; 403/24, 345

[56] References Cited

U.S. PATENT DOCUMENTS

| | | | |
|---|---|---|---|
| 2,570,515 | 10/1951 | Bonham | 192/82 T |
| 3,209,993 | 10/1965 | Seifert | 192/82 T |
| 4,062,432 | 12/1977 | Evans | 192/82 T |
| 4,269,295 | 5/1981 | Kish | 192/58 B |
| 4,386,585 | 6/1983 | Kittel et al. | 192/82 T |

Primary Examiner—Rodney H. Bonck
Attorney, Agent, or Firm—Barnes & Thornburg

[57] ABSTRACT

The invention provides an improved attachment arrangement and method for attaching a temperature responsive bi-metallic strip to the housing of a fluid friction clutch of the type having a rotatable disk disposed to rotate in a work space of a relatively rotatable housing. The work space is separated from a clutch fluid reservoir by an intermediate disk fixed to the housing and the flow of clutch fluid into the work space is controlled by a valve lever which is movably mounted for controlling the opening of a bore through the intermediate disk. The valve lever is in turn controlled by a temperature responsive bi-metallic strip mounted at the cover of the housing and a movable member extending through the housing cover and engageable with the bi-metallic strip and the valve lever. The bi-metallic strip is held in place by being clamped under ribs provided at the front side of the housing cover and is held by means of tongues at the bi-metallic strip which are abuttingly engageable with the cooling ribs. An elastic securing medium is arranged in the region of the clamping position of the bi-metallic strip for fixedly holding the bi-metallic strip at the housing cover. With this arrangement, the bi-metallic strip is fixedly attached during its assembly in the factory and cannot be taken off of the cover without disturbing the elastic securing medium. In this way, a constant clutch characteristic is guaranteed.

6 Claims, 3 Drawing Figures

FLUID FRICTION CLUTCH

BACKGROUND AND SUMMARY OF THE INVENTION

The invention relates to a fluid friction clutch with a primary part which includes a driving disk and a secondary part which includes a housing. The primary and secondary parts are rotably supported for rotation with respect to one another and the driving disk is arranged to rotate in a working space in the housing. By means of an intermediate disk secured to the housing, the working space is separated from a fluid storage space formed in the housing. An inlet bore leads from the storage space to the working space and accommodates transfer of clutch fluid which serves as the drive transfer medium between the driving disk and the housing. The clutch fluid inlet opening is controlled by means of a valve lever, which is in turn controlled by an actuating member engageable with a bi-metallic temperature responsive strip for controlling the opening of this inlet bore. The bi-metallic strip is clamped under ribs provided at the front side of a housing cover and is prevented from relative rotational movement by means of tongues formed at the ends of the bi-metallic strip and at an angle to the plane of the bi-metallic strip.

By way of background information as to the type of clutch the invention relates to, see my commonly assigned U.S. Pat. No. 4,278,158.

In known fluid friction clutches of this kind, a valve lever is mounted at an intermediate disk in the clutch housing which separates the housing into a work space and a storage space. This valve lever serves for the control of the input of clutch fluid to the working space. A control rod or member at the center of the housing cover engages with the valve lever and is engageable with a bi-metallic strip at the outside of the housing cover. The temperature dependent bending of the bi-metallic strip is transferred by means of the control member to the valve lever, which valve lever in turn controls the opening and closing of a bore connecting the storage chamber with the work space, whereby the engagement of the clutch is controlled.

With this known construction, radially extending cooling ribs are arranged on the housing cover at the outer radial regions thereof, which cooling ribs are cut-away at their ends facing the middle point of the cover so as to form a stepped opening together with the cover. These cut-outs serve for the receipt of the ends of the bi-metallic strip which can be clamped between diametrically opposite ribs and thereby held in place over the control member which engages the middle of the bi-metallic strip.

An arrangement of the above-mentioned type has been contemplated wherein the shifting member has a predetermined pressure against the bi-metallic strip which is elastically clamped at its end regions at the underside of the ribs at a spacing from the housing cover. The attachment in the circumferential direction is provided to tongues bent into the end region of the bi-metallic strips, which tongues are engageable between two adjacent cooling ribs. With this type of arrangement for temperature responsive control, the bi-metallic strips must be exactly clamped in order to assure a certain clutch characteristic. Therefore with small variations in the position of the bi-metallic strip, a change in the clutch characteristic can result. It has been learned, that especially during servicing or repair work on the clutch, the position of the bi-metallic strip can change. For example, the position of the bi-metallic strip can be changed when the clutch is being removed, or also when unintentional disturbances occur, for example when a tool engages the bi-metallic strip.

The invention is based upon the problem to develop a fluid friction clutch which does not have its clutch characteristics changed during the repair or servicing, or unintentional disturbance of the bi-metallic strip.

The invention contemplates providing an elastic securing medium in the region of the clamping positions of the bi-metallic strip so as to fixedly attach the bi-metallic strip to the housing cover. With this arrangement the bi-metallic strip is held by means of an elastic clamping closure at the housing cover, which can absorb small movements of the bi-metallic strip, while always returning to its original position. After a successful exact assembly of the clutch, the bi-metallic strip cannot be removed from the cover without disturbance or destruction of the securing medium. In this way, an ever constant clutch characteristic is guaranteed. The securing mass also results in an advantageous vibration damper, by preventing engagement of metal on metal and thereby preventing deflection of the fastening position.

According to a particularly preferred embodiment of the invention, a silicone mass is provided as the elastic mass or plug, which silicone mass is injected into the region of the clamping position and is there hardened, so that it encompasses the ends of the bi-metallic strip and is partly disposed between the cooling ribs. The invention also contemplates the injection of a silicone mass on existing fluid friction clutches whereby the end regions of the bi-metallic strips are then elastically fixed to the housing cover.

In an especially advantageous embodiment, an opening is provided in the bi-metallic strip between the tongues at its ends. With this arrangement the clamping procedure for the bi-metallic strip can proceed as previously. However the elastic silicone mass can be better supplied through this opening after the clamping, especially in the region between the housing cover plane and the underside of the bi-metallic strip so that the bi-metallic strip sits with its ends on an elastic bed.

These and further objects, features and advantages of the present invention will become more obvious from the following description when taken in connection with the accompanying drawing which shows, for purposes of illustration only, a single embodiment in accordance with the present invention.

DETAILED DESCRIPTION OF THE DRAWINGS

Figure 1:
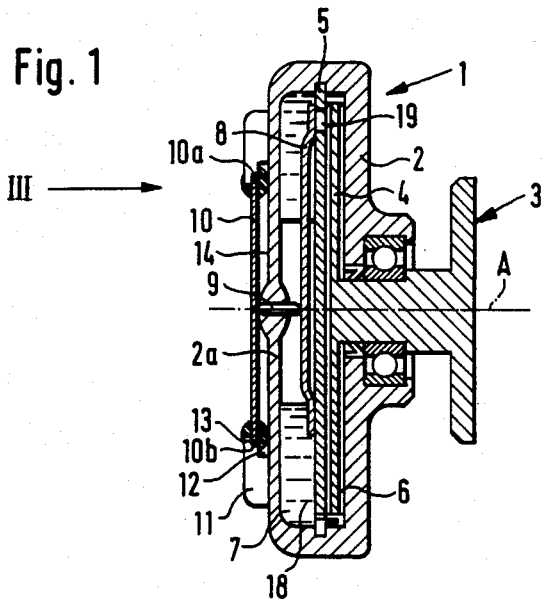
FIG. 1 is a schematic view showing a friction fluid clutch constructed in accordance with the present invention.

FIG. 1 schematically shows a fluid friction clutch with a housing 2 which is rotatably mounted with respect to driving disk 4 of the primary part 3. The driving disk 4 rotates in a work space 6 formed inside of the housing 2. The work space 6 is separated by an intermediate disk 5 from a reservoir chamber 7 which serves as a reservoir for the clutch fluid. The rotational movement of the driving disk 4 is transmitted to the housing 2, and the not illustrated fan blades (in embodiments wherein the clutch serves to selectively drive a radiator cooling fan), in dependence upon the amount of clutch fluid which is in the working space 6.

The supply of the clutch fluid to the working space 6 is by means of a bore 19 in the intermediate disk 5, the closing and opening of said bore 19 being dependent upon the position of a valve lever 8. Housing cover 2a, which is removably attached to the housing 2, is provided with an opening at the center thereof for a control member 9. This control member 9 serves to transfer movements from bi-metal strip 10 to the valve lever 8.

At the outer surface 14 of the cover 2a there are provided radially extending cooling ribs disposed adjacent one another in the circumferential direction. The bimetallic strip 10 is clamped under these cooling ribs 11. For accommodating the attachment of the bimetallic strip 10, the ribs are provided with step-like cut-outs which define a gap between the cover surface 14 and the end of the cooling ribs 11 which face the clutch axis A.

The bimetallic strip 10 has a length which is slightly smaller than the radial distance between the bottoms of the step cut-outs having the smallest overall radial length (first step). During the clamping procedure, the bimetallic strip 10 is shoved in one radial direction under the step formed with the largest radius with respect to the clutch axis A. The bimetallic strip is then pressed against the control member 9 and with the opposite free end is bent downwardly so that it also is gripped under the end of the ribs at the radially opposite side of the cover 2a. Consequently it is shoved radially in the direction of the second end so that both of the respective ends of the bi-metallic strip 10 are placed in the respective first steps of the cut-outs at the cooling ribs 11. The bimetallic strip 10 is then disposed in the position as illustrated in FIG. 1. The control member 9 thereby presses the bimetallic strip 10 against the inner surface 13 of the first step, exhibiting the smaller radius with respect to the clutch access A.

In order to prevent the movement of the bimetallic strip from its selected and adjusted position, sealing material 10a, 10b is applied at the clamping positions, which sealing material accepts the end sections of the bimetallic strip and results in a fixation of same with respect to the ribs 11 and the surface 14 of the housing cover 2a.

Figure 2:
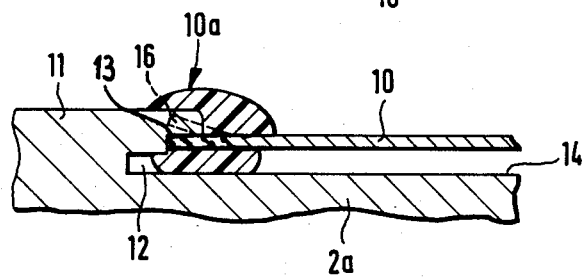
FIG. 2 is a partial sectional view through a bi-metallic strip clamping position of the clutch of FIG. 1, taken along line II—II of FIG. 3.
Figure 3:
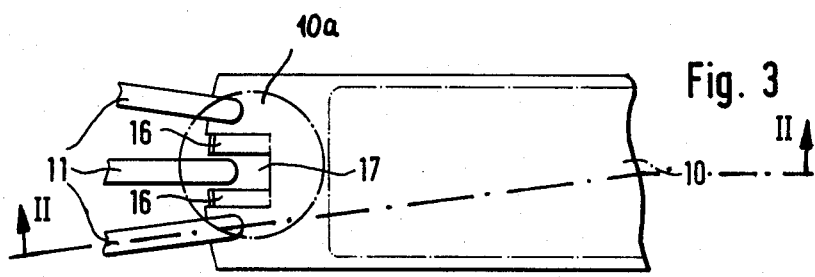
FIG. 3 is a partial view taken in the direction of arrow III of FIG. 1.

As shown in FIGS. 2 and 3, the bimetallic strip is provided with tongues 16 in the region of the clamping connections thereof. The tongues 16 are disposed at an angle with respect to the plane of the bimetallic strip 10 and engage between the ribs 11 and secure the bimetallic strip 10 against circumferential rotation. Between these tongues 16 (compare FIG. 3), an opening 17 is provided for accommodating injection of a viscous silicone material. After the hardening of the silicone material, and elastic bed is created in the form of the sealing supports or plugs 10a, 10b in the region of the clamping positions. By means of the opening 17, the silicone mass can be very simply applied to the bottom side of the bimetallic strip 10, and in the region between the cover surface 14 and the clutch facing surface of the bimetallic strips. In this way it is guaranteed that the bimetallic strip cannot be separated by means of pressure on the end regions, either intentionally or unintentionally applied. This assures that a constant clutch characteristic is provided, also after repair or unintentional disturbance of the bimetallic strip. According to preferred embodiments, the elastic securing mass or medium to be used is the sealing material of the assignee of this application, sold under the trade name "Behrstik." This silicone mass is also called RTV (room temperature vulcanizing) material.

While I have shown and described a single embodiment in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. A fluid friction clutch comprising:
    housing means defining a working space and a reservoir space,
    primary and secondary parts mounted for relative rotation with respect to each other and exhibiting working surfaces disposed in said working space,
    valve means interposed between the working space and the reservoir space for controlling a supply of clutch fluid to the working space to thus control the fluid drive connection between the working surfaces of the primary and secondary parts,
    and temperature responsive valve control means for controlling an opening of said valve means as a function of temperature, said valve control means including a bimetallic strip means mounted at a cover means of the housing means, and a mechanical valve actuation drive arrangement extending from the bimetallic strip, through the cover means, and to the valve means to selectively move the same,
    wherein said bimetallic strip is held in position at said cover by pretensioned tongue means at the ends of said strip at finger means formed on said cover,
    and wherein said bimetallic strip is further fixedly secured at said cover by elastic securing plug means in the regions of the interengaging tongue and finger means to continuously resiliently support the bimetallic strip against the finger means.

2. Clutch according to claim 1, wherein said bi-metallic strip includes bent portions at its end regions which interengage with the finger means to prevent rotational movement of the strip with respect to the cover.

3. Clutch according to claim 2, wherein an opening is provided at each end of the bimetallic strip, intermediate the tongue means, said openings being dimensioned and configured to accommodate injection of a silicone mass to the space under the ends of the bimetallic strip to form said plug means.

4. Clutch according to claim 1, wherein the finger means are formed at stepped cut-outs of cooling ribs extending radially on the cover, and wherein a silicone mass is provided as the elastic plug means, which silicone mass is injected into the region of the clamping position in a viscous condition, which then becomes polymerized to form said securing plug means, which plug means encompasses the ends of the bimetallic strip as well as the adjacent region of the ribs.

5. Clutch according to claim 3, wherein an opening is provided at each end of the bimetallic strip, intermediate the tongue means, said openings being dimensioned and configured to accommodate injection of said silicone mass to the space under the ends of the bimetallic strip.

6. Clutch according to claim 1, wherein an opening is provided at each end of the bimetallic strip, intermediate the tongue means, said openings being dimensioned and configured to accommodate injection of a silicone mass to the space under the ends of the bimetallic strip to form said plug means.

* * * * *